United States Patent

Hyllstam et al.

[11] Patent Number: 6,080,438
[45] Date of Patent: Jun. 27, 2000

[54] METHOD FOR PREPARING FOOD PRODUCTS FOR FURTHER PROCESSING

[75] Inventors: Mari Hyllstam, Helsingborg, Sweden; Bruce C. Jara, Amherst, Ohio; Sten Påhlsson, Ödåkra, Sweden; Joseph A. Vozella, III, Hampton, N.H.

[73] Assignee: Frigoscandia Equipment AB, Helsingborg, Sweden

[21] Appl. No.: 09/054,546

[22] Filed: Apr. 3, 1998

[51] Int. Cl.⁷ ........................................... A21D 6/00
[52] U.S. Cl. .................... 426/496; 426/523; 426/524
[58] Field of Search .................. 426/496, 511, 426/520, 523, 524; 99/386

[56] References Cited

U.S. PATENT DOCUMENTS

| | | | |
|---|---|---|---|
| 3,952,643 | 4/1976 | Wolfelsperger et al. | 99/337 |
| 4,036,569 | 7/1977 | Oshikiri | 425/140 |
| 4,350,710 | 9/1982 | Sundermann | 426/496 |
| 4,366,177 | 12/1982 | Wells et al. | 426/523 |
| 4,788,067 | 11/1988 | Seneau | 426/496 |
| 5,466,143 | 11/1995 | Suzuki et al. | 425/140 |
| 5,593,713 | 1/1997 | De La Luz-Martinez et al. | 426/496 |

FOREIGN PATENT DOCUMENTS

| | | |
|---|---|---|
| 0105056 | 4/1984 | European Pat. Off. |
| 1247999 | 9/1971 | United Kingdom |
| 8200080 | 1/1982 | WIPO |
| 9534220 | 12/1995 | WIPO |

*Primary Examiner*—George C. Yeung
*Attorney, Agent, or Firm*—Browdy and Neimark

[57] ABSTRACT

In a method of preparing soft or sticky food products for further processing, the food products are heated from below for setting a surface layer of the food products which forms a crust holding and supporting the food products during further processing. An apparatus for performing this method comprises a belt conveyor having a conveyor belt for conveying the soft or sticky food products along a path upstream of the further processing, and heating element positioned below and on both sides of the conveyor belt in the path upstream of the further processing. The heating elements heat the soft or sticky food products on the conveyor belt from below and laterally for forming a crust which is able to hold and support the food products during the further processing.

20 Claims, 2 Drawing Sheets

METHOD FOR PREPARING FOOD PRODUCTS FOR FURTHER PROCESSING

BACKGROUND OF THE INVENTION

1. Technical Field of the Invention

This invention generally is related to the processing of soft or sticky food products and, more precisely, is related to a preparatory treatment of such food products performed before and simplifying the processing thereof, especially the processing of the food products by air on a foraminous conveyor belt,

2. Prior Art

Many food products being processed in the food industry are soft or sticky in the initial state of the processing. Dough for making bread, batter for batter cakes and marinated chicken parts are examples of such soft or sticky food products. Therefore, it often is necessary to use carriers, e.g. pans, plates and trays, which are designed to support the food products during the processing.

These carriers prolong the processing time. Further, when the processing is performed at several separate processing stations, the transferring of the food products between the stations is complicated as a result of the carriers. Also, the carriers prevent processing of food products produced in continuous lengths. Finally, if the carriers are recycled after the completion of the processing of the food products, they often need to be cleaned as they do not always prevent loss of food product.

SUMMARY OF THE INVENTION

Therefore, a main object of the invention is to eliminate the disadvantages of the carriers referred to above.

A more specific object of the invention is to enable processing of initially soft or sticky food products in continuous lengths on a foraminous conveyor belt and also enable processing without substantial loss of the food products.

These and other objects are achieved in that the present invention provides a method of preparing soft or sticky food products for processing on a foraminous conveyor belt, wherein the food products are positioned on an endless, substantially fluid impermeable conveyor belt and are heated from below for setting a surface layer on the bottom side of the food products which forms a crust holding and supporting the food products during a subsequent processing.

Such a crust may be formed which is able to support the food product without any carrier, i.e. also on a foraminous conveyor belt having an upper rough supporting surface, without any substantial impressions being formed on the food product. It also enables the forming of the food products as continuous lengths, e.g. strings or sheets, on the endless conveyor belt, although the food products may take other forms.

The heating is preferably such as to produce a flexible surface layer, like a skin, and thereby enabling flexing of the food products when transferred to another processing station or foraminous conveyor belt for the subsequent processing, Thus, the set surface layer should be thin, e.g. having a thickness of less than 2 mm, when the food products consist of dough, but having a thickness of more than 1 mm and preferably less than 10 mm, when the food products consist of batter. The set surface layer should be so tough that it without any risk of breaking holds the rest, i.e. the major part of the food product to be treated in the subsequent processing.

The heating may be extended to the lateral sides and also to the top of the food products such that a crust fully enclosing the rest of the food product is formed.

The conveyor belt may follow an upper forward run from a first roller to a second roller and a lower return run from the second roller back to the first roller. A heating element is provided between the upper run and the lower run of the conveyor belt so as to heat the conveyor belt in its upper run and also the bottom side of the food products carried by the conveyor belt. Two further heating elements are provided laterally on either side of the conveyor belt in its upper tun so as to heat the lateral sides of the food products carried by the conveyor belt.

The necessary increase of the temperature of the bottom and lateral surfaces of the food products for forming a crust is decisive for selecting the heating capacity of the heating elements and the speed of the conveyor belt. Of course, this temperature increase also is dependent upon the specific food product.

The invention is advantageously used for preparatory treatment of dough pieces. Thus, in a method for producing baked articles from dough pieces by first proofing the dough pieces and then baking the proofed dough pieces, the dough pieces are heated from below prior to proofing for setting the bottom side of the dough nieces and forming a crust which holds and supports the dough pieces during the proofing and baking steps.

The subsequent Processing may be performed directly after the preparatory treatment of the food products or may be delayed and performed at a later time. Thus, the subsequent processing may be freezing of the food products. When the food products contain yeast, the subsequent processing could be freezing, proofing and freezing, proofing and baking or proofing, baking and freezing of the food products.

DESCRIPTION OF THE PREFERRED EMBODIMENTS

Figure 1:
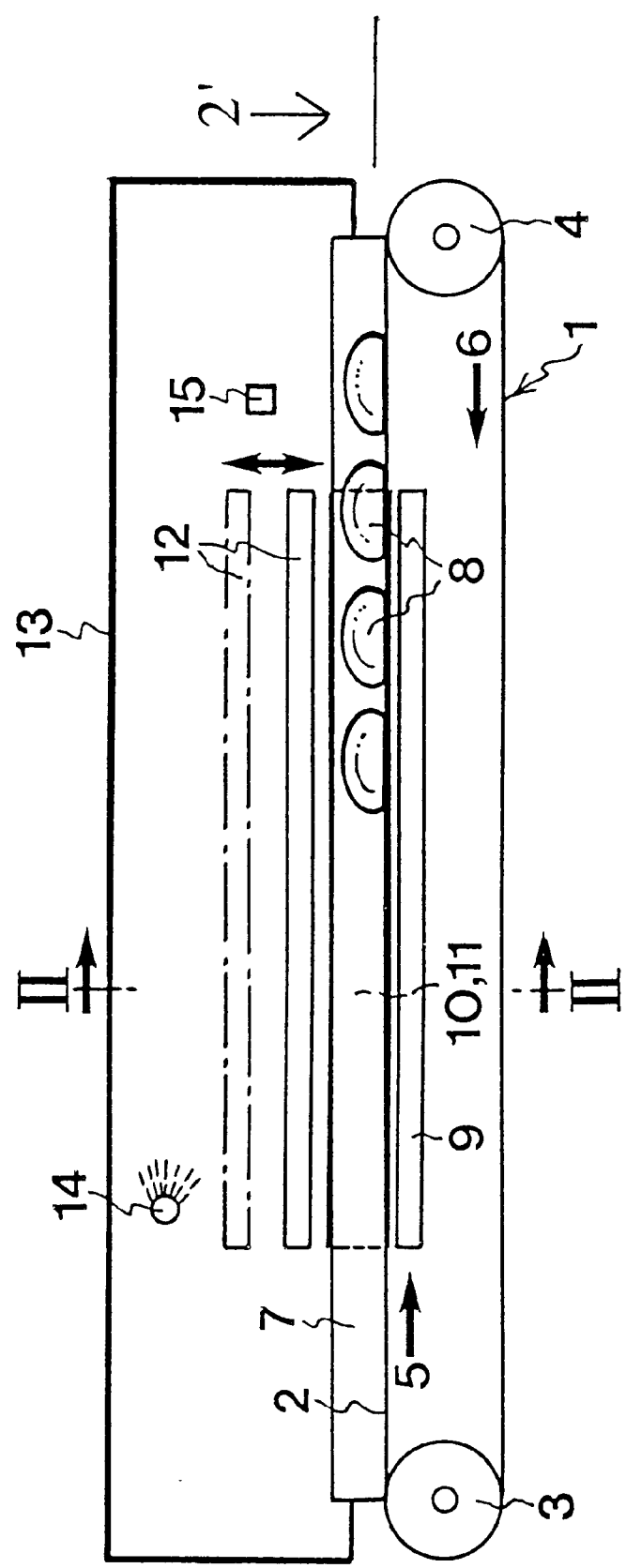
FIG. 1 is a cross-sectional view of a belt conveyor embodying the present invention along the lines I—I in FIG. 2.
Figure 2:
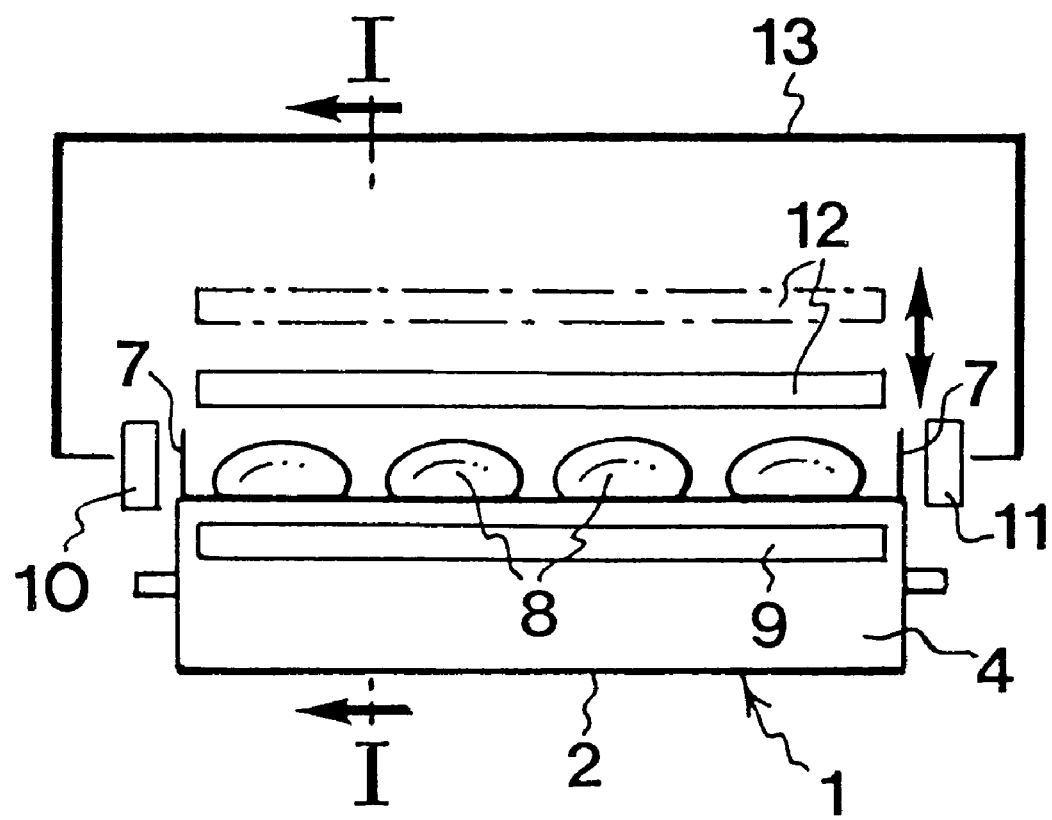
FIG. 2 is a cross-sectional view along the lines II—II in FIG. 1.

Referring to FIG, 1, a belt conveyor 1 comprises a conveyor belt 2 and two rollers 3 and 4. The conveyor belt 2 follows an upper straight run 5 from the roller 3 to the roller 4, and follows a lower return run 6 from the roller 4 back to the roller 3.

The conveyor belt 2 consists of a heat resistant material. Side walls 7 may be provided on the conveyor belt 2 so as to stop liquid or semi-liquid food products from flowing off the conveyor belt 2. These side walls 7 may extend along a part of or the whole length of the conveyor belt 2 or they may have the shape of a plurality of frames. Preferably, the side walls 7 are not fixed to the conveyor belt 2.

The conveyor belt 2 may have a surface coating on its upper surface in the upper run 5 that reduces the adherence of food products 8 to the conveyor belt.

A heating element 9 which may be an electric element or of a type using heated oil, is provided directly below the upper run 5, Further, a second heating element 10 and a third heating element 11 are provided on either side of the conveyor belt 2 in its upper run 5. Finally, a fourth heating element 12 may be provided above the upper run 5 of the conveyor belt 2 at such height as to allow the food products 8 to pass freely or almost freely thereunder. Preferably, the height of the fourth heating element 12 above the conveyor belt 2 is adjustable, as illustrated by the dotted lines above the heating element 12. By using the fourth heating element 12, it is possible to obtain a substantially flat upper surface on the food products 8 which is advantageous inter alia when producing croutons, since the cutting of the bread lengths or loafs into cubes is facilitated.

The heat effect of the heating element 9 may be dimensioned on the basis of the heat conductivity of the conveyor belt 2 and the heat required to form a crust on the bottom surface of the food products 8. Preferably, the heat generated by the heating element 9 is controlled by a circuit controlling the power that is supplied thereto. The heating elements 10–12 may be controlled correspondingly.

Also, the speed of the conveyor belt 2 may be varied in order to control the temperature increase at the bottom, the lateral and the top sides of the food products 8 carried by the conveyor belt 2 along the upper run 5.

Further, in order to control the relative humidity (RH) affecting the dry out of the surface of the food products 8, the apparatus may be arranged under a hood 13 within which a steams injector 14 is positioned near the inlet end of the belt conveyor 1 and controlled by a RH-sensor 15 positioned near the outlet end of the belt conveyor 1.

Of course, other means for humidity control, and also other forms of environmental control may be used, including equivalents to the hood 13, the steam injector 14 and the RH-sensor 15.

The operation of the above apparatus is as follows:

A motor (not shown) driving the belt conveyor 1 is started and power is supplied to the heating element 9 and possibly also to the heating elements 10–12. Food products 8 are placed on the conveyor belt 2 at the roller 3 and are carried by the conveyor belt 2 past the heating elements 9–12 at such a rate that the desired crust is formed on the food products. The steam injector 14 may be activated and operative under control of the RH-sensor 15 during the forming of the crust such that the top surface of the food products is prevented from drying out and the food products are well conditioned for a further processing.

Then, the food products 8 are transferred to another processing station or conveyor belt 2' where they do not need any separate carrier since the crust formed is able to support the food products 8 irrespective of the shape of any means carrying the food products to, through and from the further processing stations 2' where the actual processing is carried out.

Preferably, the further processing should include a heating step. However, one of several further processing steps may be a freezing step such that the following processing steps may be delayed a time period of an almost arbitrary length and even performed at a different location.

Preferably, the crust is made so thin that the products remain flexible, i.e. the crust is a flexible layer having a thickness of less than about 10 mm,, preferably less than about 2 mm, when the food products consist of dough, and having a thickness or more than about 1 mm, when the products consist of batter.

The inventive method is advantageously used as a preparatory treatment of dough before the proofing thereof when producing bread products, but it may also be used for such products as batter cakes and marinated chicken parts.

When preparing dough pieces the temperature of the heating elements 9–10 may be about 150–250° C. and the speed of the conveyor belt may be such that the dough lengths or pieces are heated for less than about 1 minute. When preparing batter cakes the heating time will be longer and may well amount to about 10 minutes.

The expert realizes that several modifications of the above-described embodiment of a method and an apparatus for preparing soft or sticky food products for further processing are conceivable within the scope of the invention as defined in the appended claims

What is claimed is:

1. A method of preparing soft or sticky food products for transfer and processing on a foraminous conveyor belt, comprising the steps of:

positioning the food products on an endless, substantially fluid impermeable conveyor belt and heating the food products from below for setting only a surface layer on the bottom side of the food products as a flexible layer;

holding and supporting the food products by said flexible layer during a transfer and subsequent processing of the food products.

2. The method as claimed in claim 1, wherein the food products are formed as a continuous length on the endless conveyor belt.

3. The method as claimed in claim 1, wherein the conveyor belt is moved in a path above a heating element.

4. The method as claimed in claim 1, wherein the flexible layer has a thickness of less than 2 mm, when the food products consist of dough, and a thickness of more than 1 mm, when the products consist of batter.

5. The method as claimed in claim 1, wherein the food products also are heated laterally for setting a surface layer on the lateral sides of the food products.

6. The method as claimed in claim 1, wherein the food products also are heated from above so as to form a top crust.

7. The method as claimed in claim 2, wherein the lengths are formed as strings or sheets.

8. The method as claimed in claim 1, wherein the subsequent processing is selected from the group consisting of freezing, proofing and freezing, proofing and baking, and proofing, baking and freezing.

9. The method as claimed in claim 1, wherein the relative humidity above the substantially impermeable conveyor belt is controlled during the heating of the food products.

10. The method as claimed in claim 1, wherein the food products are formed as a continuous length on the endless conveyor belt.

11. The method as claimed in claim 5, wherein the food products are formed as a continuous length on the endless conveyor belt.

12. The method as claimed in claim 8, wherein the food products are formed as a continuous length on the endless conveyor belt.

13. The method as claimed in claim 1, wherein the conveyor belt is moved in a path above a heating element.

14. The method as claimed in claim 5, wherein the conveyor belt is moved in a path above a heating element.

15. The method as claimed in claim 8, wherein the conveyor belt is moved in a path above a heating element.

16. A method of preparing soft or sticky food products on a first processing station for transfer and processing on a second processing station, comprising the steps of:

positioning the food products on said first processing station comprising an endless, substantially fluid impermeable conveyor belt and heating the food products from below for setting only a surface layer on the bottom side of the food products as a flexible layer, respectively holding and supporting the food products by said flexible layer during a subsequent transfer and processing of the food products to and on said second processing station.

17. The method as claimed in claim 16, wherein said second processing station is a foraminous conveyor belt having a surface which leaves no impressions on said food products.

18. The method as claimed in claim 17, wherein said processing on said second processing station includes a heating step.

19. The method as claimed in claim 16, wherein said processing on said second processing station includes a freezing step.

20. The method as claimed in claim 3, further comprising the step of heating the element to a temperature of about 150° C.–250° C.

\* \* \* \* \*